(12) United States Patent
Usuda et al.

(10) Patent No.: US 8,488,469 B2
(45) Date of Patent: *Jul. 16, 2013

(54) TRANSMISSION RATE CONTROL METHOD, AND MOBILE STATION

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 840 days.

This patent is subject to a terminal disclaimer.

(21) Appl. No.: 11/510,785

(22) Filed: Aug. 28, 2006

(65) Prior Publication Data

US 2007/0047445 A1    Mar. 1, 2007

(30) Foreign Application Priority Data

Aug. 29, 2005  (JP) ................ P2005-248504

(51) Int. Cl.
| | | |
|---|---|---|
| *G01R 31/08* | (2006.01) | |
| *H04W 4/00* | (2009.01) | |
| *H04B 7/216* | (2006.01) | |
| *H04L 12/26* | (2006.01) | |

(52) U.S. Cl.
USPC ............ 370/236; 370/329; 370/335; 370/239

(58) Field of Classification Search
USPC ................. 370/329, 235, 328, 496, 335, 236, 370/239, 431
See application file for complete search history.

(56) References Cited

U.S. PATENT DOCUMENTS 6,374,085 B1    4/2002 Saints et al.
(Continued)

FOREIGN PATENT DOCUMENTS

| CN | 1656826 A | 8/2005 |
| TW | 200428803 | 3/2010 |

OTHER PUBLICATIONS

3GPP TS 25.309 V6.2.0 (Mar. 2005), 3rd Generation Partnership Project; Technical Specification Group Radio Access Network; FDD Enhanced Uplink; Overall description; Stage 2 (Release 6), p. 1-30.

(Continued)

*Primary Examiner* — James Wozniak
*Assistant Examiner* — Kuo Woo
(74) *Attorney, Agent, or Firm* — Marvin A. Motsenbocker; Mots Law, PLLC

(57) ABSTRACT

A transmission rate control method for controlling a transmission rate of uplink user data, based on a received relative transmission rate of the uplink user data which is transmitted via an E-RGCH, includes: transmitting, at a radio base station, any one of Up command which instructs to increase the transmission rate of the uplink user data, Down command which instructs to decrease the transmission rate of the uplink user data, or Don't care command which instructs to maintain the transmission rate of the uplink user data, to the mobile station via the E-RGCH, as the relative transmission rate; and maintaining, at the mobile station, the transmission rate of the uplink user data, when the mobile station receives the Down command or the Don't care command, and when the uplink user data to be transmitted become empty in a transmission buffer of the mobile station.

3 Claims, 11 Drawing Sheets

U.S. PATENT DOCUMENTS

| | | | |
|---|---|---|---|
| 6,650,905 B1 | 11/2003 | Toskala et al. | |
| 7,493,132 B2 | 2/2009 | Malladi et al. | |
| 7,496,075 B2* | 2/2009 | Kwak et al. | 370/335 |
| 7,693,170 B2* | 4/2010 | Usuda et al. | 370/431 |
| 2003/0219037 A1* | 11/2003 | Toskala et al. | 370/496 |
| 2004/0218533 A1* | 11/2004 | Kim et al. | 370/235 |
| 2004/0252658 A1 | 12/2004 | Hosein et al. | |
| 2005/0238053 A1* | 10/2005 | Iochi et al. | 370/473 |
| 2006/0018277 A1* | 1/2006 | Petrovic et al. | 370/329 |
| 2006/0203780 A1* | 9/2006 | Terry | 370/335 |

OTHER PUBLICATIONS

3rd Generation Partnership Project; Technical Specification Group Radio Access Network; FDD Enhanced Uplink; Overall description; Stage 2 (Release 6); 3GPP TS 25.309 v6.3.0 (Jun. 2005); pp. 1-33.

NTT DoCoMo, Inc; "Issues for holding serving grant"; 3GPP TSG RAN 2#47, Athens Greece, pp. 1-2(2005).(Cited in the official action in the counterpart Japanese patent application).

* cited by examiner

TRANSMISSION RATE CONTROL METHOD, AND MOBILE STATION

CROSS REFERENCE TO RELATED APPLICATION

This application is based upon and claims the benefit of priority from the prior Japanese Patent Application No. P2005-248504, filed on Aug. 29, 2005; the entire contents of which are incorporated herein by reference.

BACKGROUND OF THE INVENTION

1. Field of the Invention

The present invention relates to a transmission rate control method for controlling a transmission rate of uplink user data at a mobile station based on a received relative transmission rate of the uplink user data which is transmitted from a radio base station via a relative transmission rate control channel, and a mobile station used in the transmission rate control method.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

In the mobile communication system to which the "Enhanced Uplink" is applied, the mobile station UE is configured to increase the transmission rate of the uplink user data (to be exact, a transmission power ratio of an "Enhanced Dedicated Physical Data Channel (E-DPDCH)" to a "Dedicated Physical Control Channel (DPCCH)", or an E-DPDCH transmission power offset), when the mobile station UE receives "Up command (+1)" which is transmitted from the radio base station Node B via an "Enhanced Relative Grant Channel (E-RGCH)".

On the other hand, when the uplink user data to be transmitted become empty in the transmission buffer of the mobile station UE, the radio base station Node B is configure to transmit "DTX" via the E-RGCH (that is, the radio base station Node B transmits nothing). Thus, the transmission rate of the uplink user data of the mobile station UE can be maintained.

However, in the above case, the mobile station UE may determine that "Down command (−1)" is received at the mobile station UE, even when the radio base station Node B transmits "DTX".

When the mobile station UE determines that "Down command (−1)", is received, the mobile station UE is configured to decrease the previously used transmission rate of the uplink user data by a certain value.

In other words, in the above case, the transmission rate of the uplink user data is decreased by a predetermined value even though the mobile station UE transmits nothing in the previous TTI (Transmission Time Interval). Accordingly, there has been a problem that the transmission rate of the uplink user data cannot be maintained.

As a result, in the above case, the radio base station Node B is required to perform the processing, such as notifying an absolute transmission rate of the uplink user data via an "Enhanced Absolute Grant Channel (E-AGCH)", which causes the transmission delay.

BRIEF SUMMARY OF THE INVENTION

The present invention has been made considering the problems, and its object is to provide a transmission rate control method which can realize a smooth data transmission without decreasing a transmission rate of uplink user data, even if other uplink user data to be transmitted reoccurs in a transmission buffer of a mobile station after the uplink user data to be transmitted becomes empty in the transmission buffer, and a mobile station used in the transmission rate control method.

A first aspect of the present invention is summarized as a transmission rate control method for controlling, at a mobile station, a transmission rate of uplink user data, based on a received relative transmission rate of the uplink user data which is transmitted by a radio base station via a relative transmission rate control channel, including: transmitting, at a radio base station, any one of Up command which instructs to increase the transmission rate of the uplink user data, Down command which instructs to decrease the transmission rate of the uplink user data, or Don't care command which instructs to maintain the transmission rate of the uplink user data, to the mobile station via the relative transmission rate control channel, as the relative transmission rate; and maintaining, at the mobile station, the transmission rate of the uplink user data, when the mobile station receives the Down command or the Don't care command, and when the uplink user data to be transmitted become empty in a transmission buffer of the mobile station.

A second aspect of the present invention is summarized as a mobile station for controlling a transmission rate of uplink user data based on a received relative transmission rate of uplink user data which is transmitted by a radio base station via a relative transmission rate control channel, including: a relative transmission rate control channel receiver configured to receive any one of Up command which instructs to increase the transmission rate of the uplink user data, Down command which instructs to decrease the transmission rate of the uplink user data, or Don't care command which instructs to maintain the transmission rate of the uplink user data, from the radio base station via the relative transmission rate control channel; and a transmission rate controller configured to maintain the transmission rate of the uplink user data, when the mobile station receives the Down command or the Don't care command, and when the uplink user data to be transmitted become empty in a transmission buffer of the mobile station.

DETAILED DESCRIPTION OF THE INVENTION (Configuration of Mobile Communication System According to First Embodiment of the Present Invention)

Referring to FIGS. 3 to 14, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
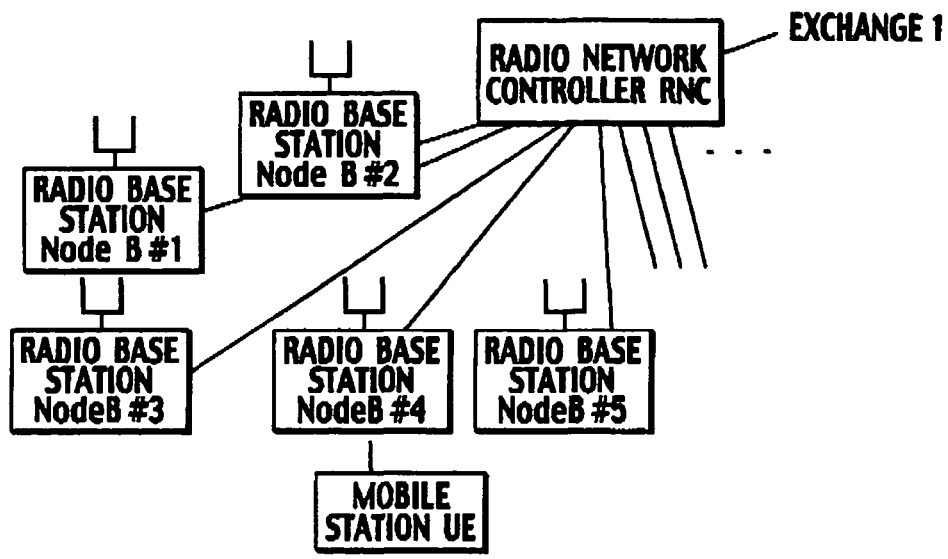
FIG. 1 is diagram of an entire configuration of a general mobile communication system.
Figure 2A:
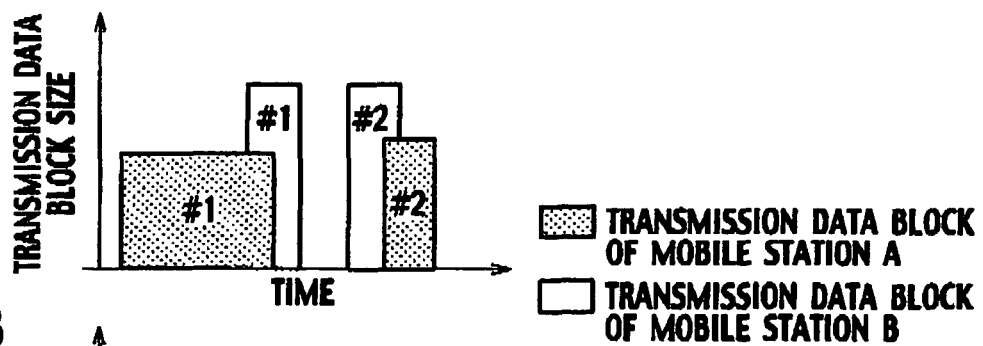
FIGS. 2A to 2C are graphs for explaining the method for controlling a transmission rate of uplink user data in a conventional mobile communication system.
Figure 2B:
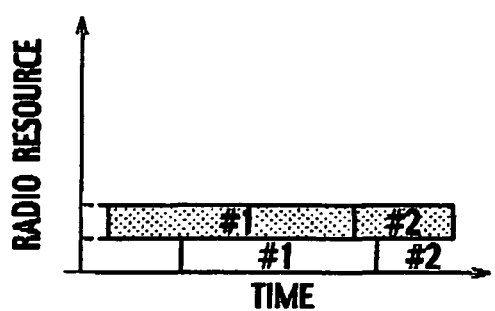
Figure 2C:
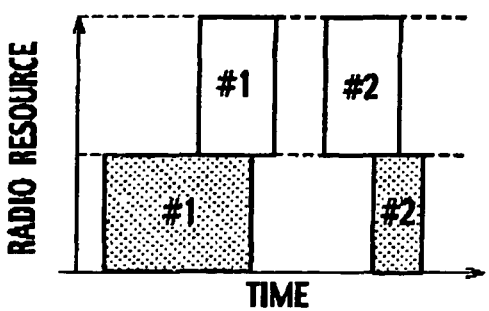
Figure 3:
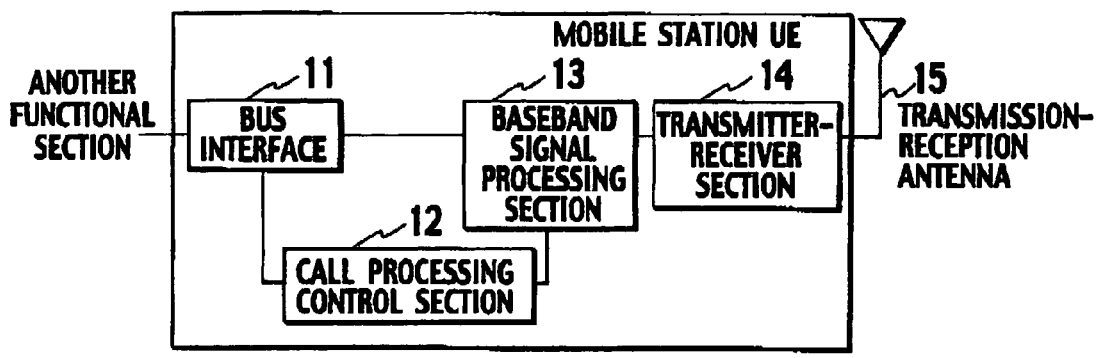
FIG. 3 is a functional block diagram of a mobile station in a mobile communication system according to a first embodiment of the present invention.

An example of general configuration of a mobile station UE according to this embodiment is shown in FIG. 3.

As shown in FIG. 3, the mobile station UE is provided with a bus interface 11, a call processing control section 12, a baseband signal processing section 13, a transmitter-receiver section 14, a transmission-reception antenna 15, and a transmission buffer 16. In addition, the mobile station UE can be configured to include an amplifier section (not shown in FIG. 3).

However, these functions do not have to be independently present as hardware. That is, these functions can be partly or entirely integrated, or can be configured through a process of software. In addition, the transmission buffer 16 can be provided in a MAC-e functional section 134, which will be described layer on.

Figure 4:
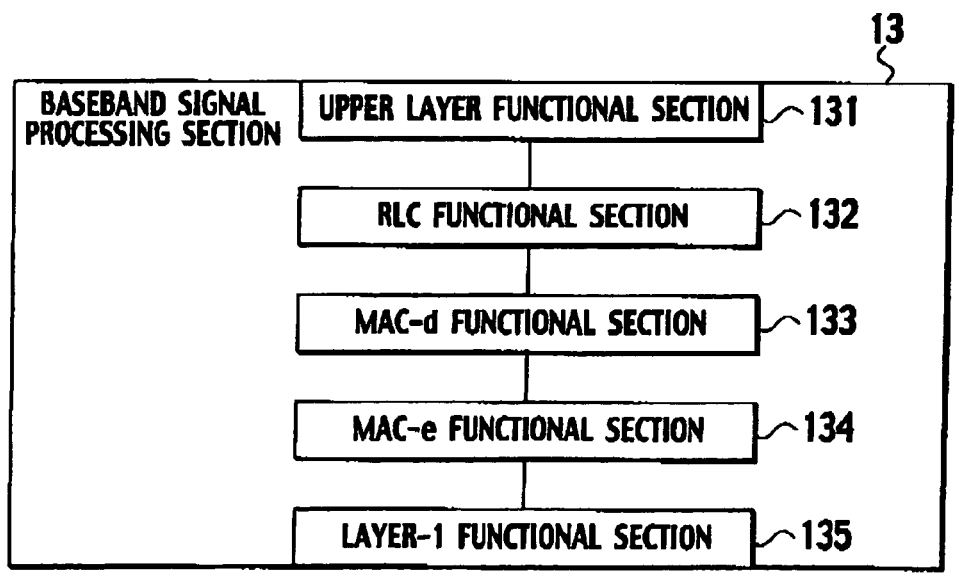
FIG. 4 is a functional block diagram of a baseband signal processing section of the mobile station in the mobile communication system according to the first embodiment of the present invention.

In FIG. 4, a functional block of the baseband signal processing section 13 is shown.

As shown in FIG. 4, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 5:
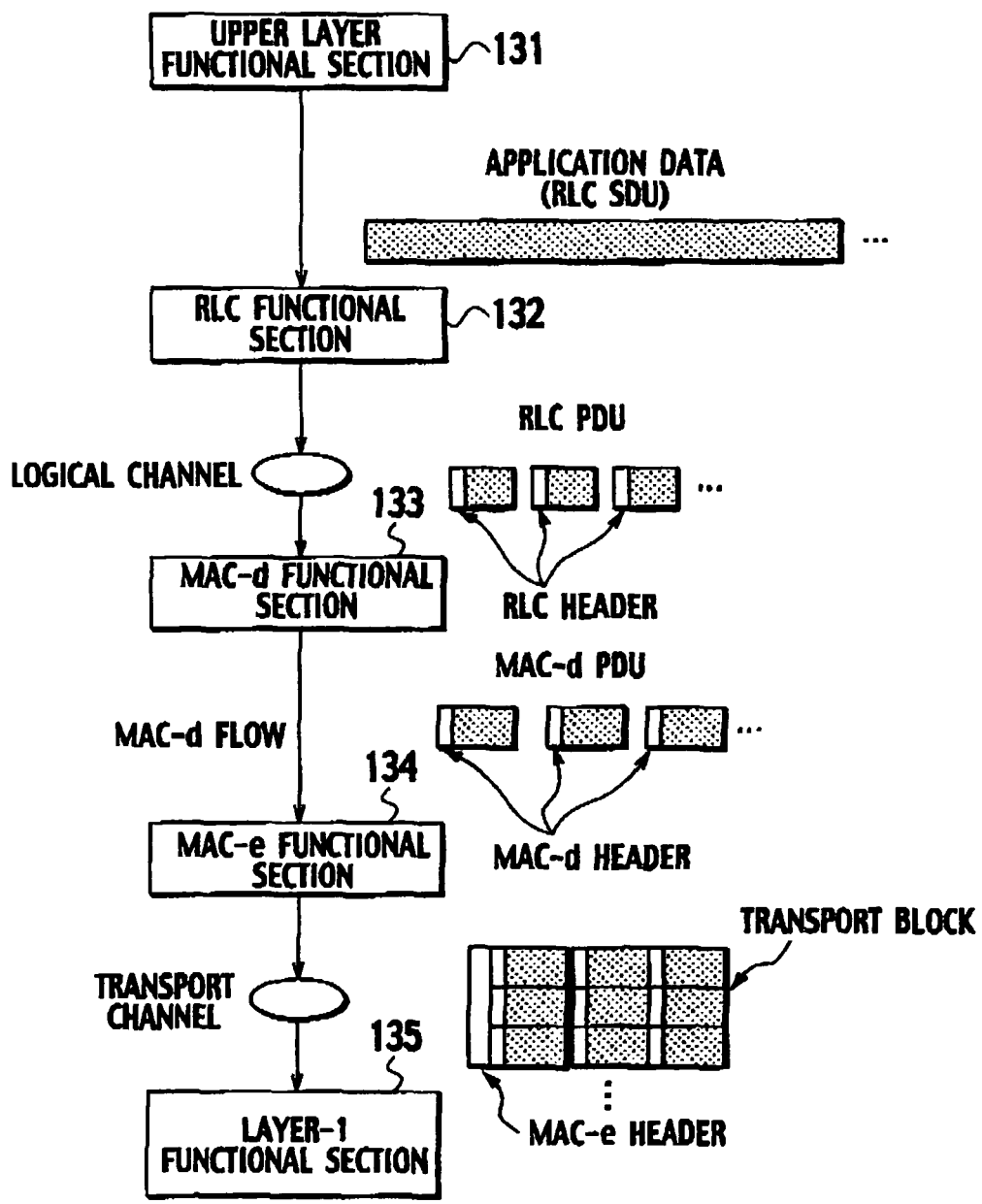
FIG. 5 is a diagram for explaining functions of the baseband signal processing section of the mobile station in the mobile communication system according to the first embodiment of the present invention.

As shown in FIG. 5, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 6:
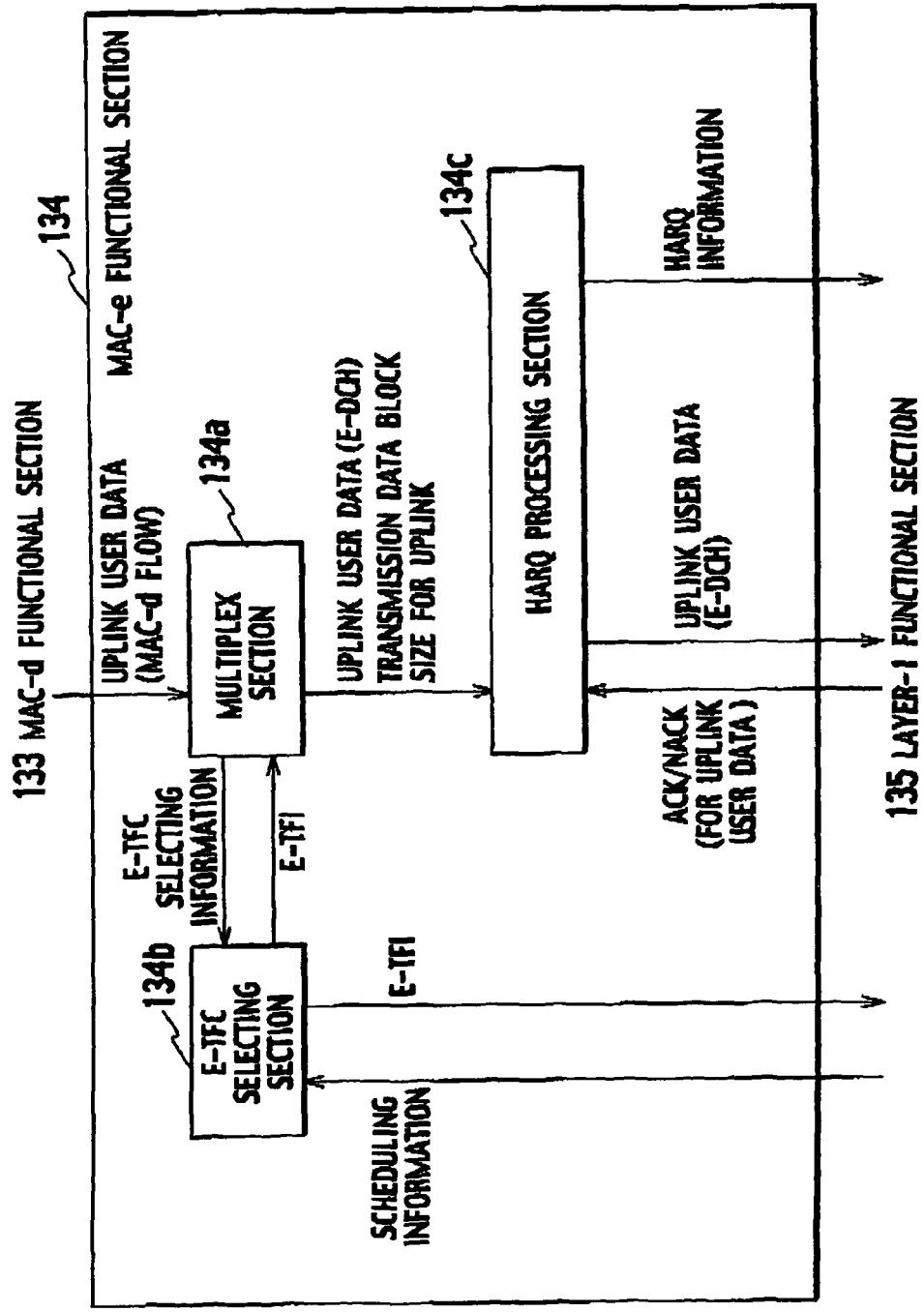
FIG. 6 is a functional block diagram of a MAC-e functional section in the baseband signal processing section of the mobile station in the mobile communication system according to the first embodiment of the present invention.

Specifically, as shown in FIG. 6, the MAC-e functional section 134 is provided with a multiplex section 134a, an E-TFC selecting section 134b, and an HARQ processing section 134c.

The multiplex section 134a is configured to perform a multiplex processing to the uplink user data, which is received from the MAC-d functional section 133 as MAC-d flow, based on a "Enhanced-Transport Format Indicator (E-TFI)" notified from the E-TFC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the E-TFC selecting section 134b, E-TFC selecting information for selecting a transport format for the received uplink user data.

Here, the E-TFC selecting information includes data size and priority class of the uplink user data, or the like.

Figure 7:
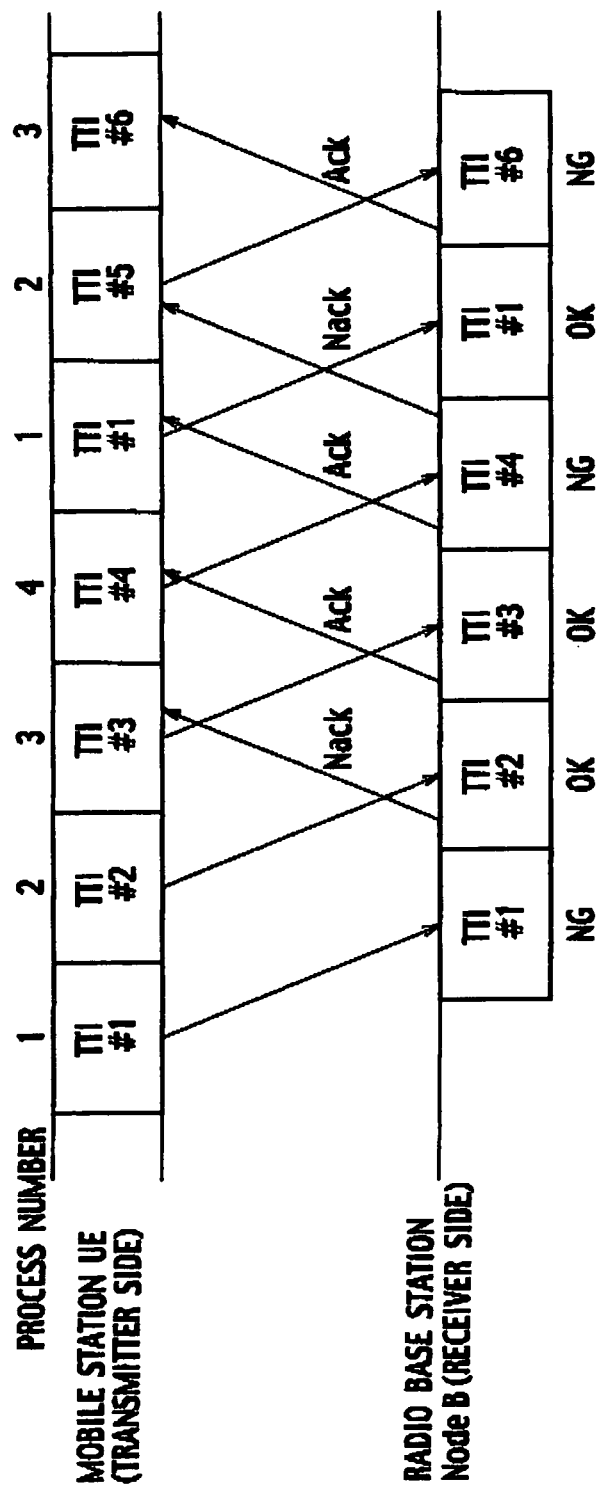
FIG. 7 is a graph illustrating an operation of four channel stop and wait protocol performed by an HARQ processing section in the MAC-e functional section in the baseband signal processing section of the mobile station in the mobile communication system according to the first embodiment of the present invention.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135. An example for operations of the "4 channel stop and wait protocol" is shown in FIG. 7.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (UP command or DOWN command) via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

Furthermore, when the E-TFC selecting section 134b receives the relative transmission rate of the uplink user data ("Don't care command") via the E-RGCH as the scheduling information, the E-TFC selecting section 134b does not change the transmission rate of the uplink user data, but maintains the transmission rate of the uplink user data at the timing of receiving the relative transmission rate.

Here, the "Up command" is information (+1) which instructs, from the radio base station Node B, to increase the transmission rate of the uplink user data of the mobile station The "Down command" is information (−1) which instruct, from the radio base station Node B, to decrease the transmission rate of the uplink user data of the mobile station UE.

The "Don't care command" is information (0) which instructs, from the radio base station Node B, to maintain the transmission rate of the uplink user data of the mobile station UE.

However, the E-TFC selecting section 134*b* is configured to maintain the transmission rate of the uplink user data, when the E-TFC selecting section 134*b* receives the "Down command" or the "Don't care command", and when the uplink user data to be transmitted become empty in the transmission buffer 16.

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 8:
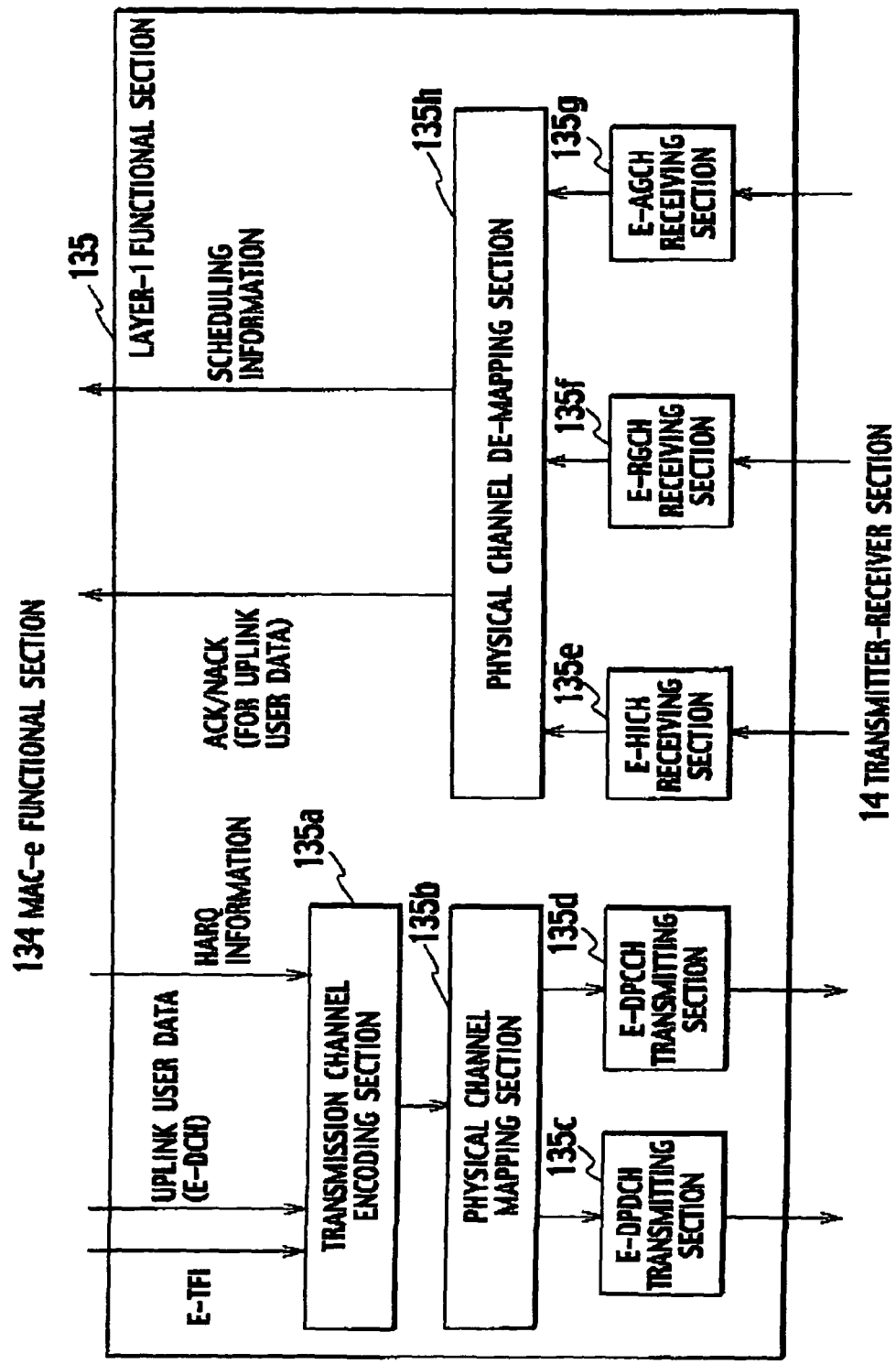
FIG. 8 is a functional block diagram of a layer-1 functional section in the baseband signal processing section of the mobile station in the mobile communication system according to the first embodiment of the present invention.

As shown in FIG. 8, the layer-1 functional section 135 is provided with a transmission channel encoding section 135*a*, a physical channel mapping section 135*b*, an E-DPDCH transmitting section 135*c*, an E-DPCCH transmitting section 135*d*, an E-HICH receiving section 135*e*, an E-RGCH receiving section 135*f*, an E-AGCH receiving section 135*g*, and a physical channel de-mapping section 135*h*.

Figure 9:
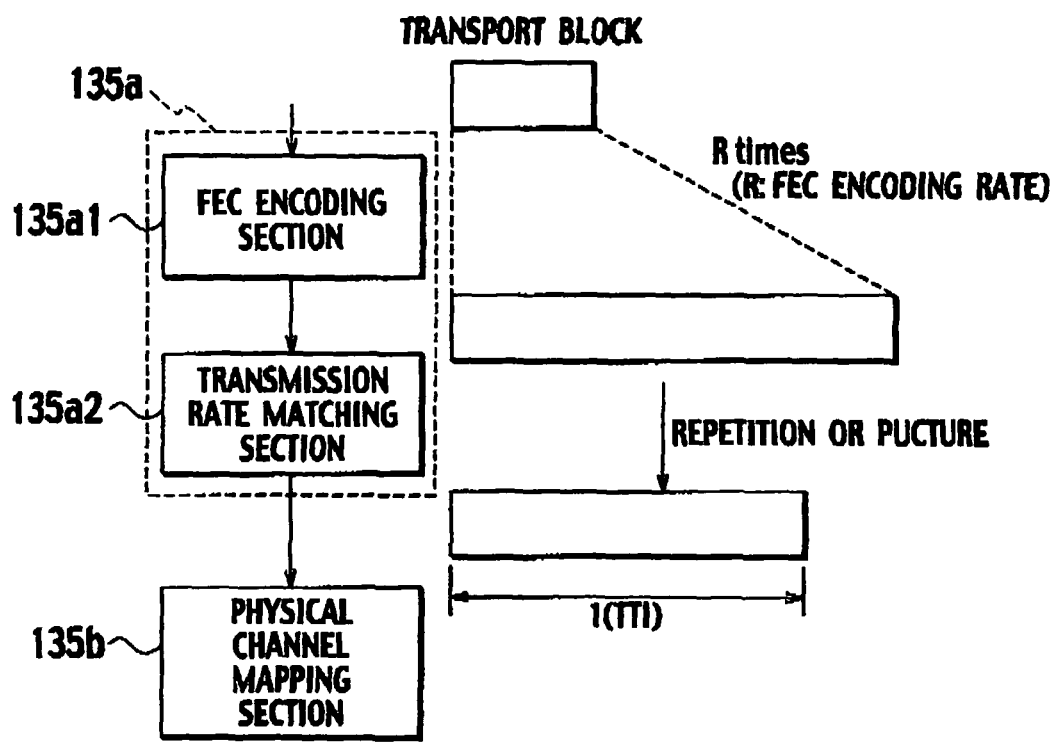
FIG. 9 is a diagram for explaining functions of the layer-1 functional section in the baseband signal processing section of the mobile station in the mobile communication system according to the first embodiment of the present invention.

As shown in FIG. 9, the transmission channel encoding section 135*a* is provided with a FEC (Forward Error Correction) encoding section 135*a*1, and a transmission rate matching section 135*a*2.

As shown in FIG. 9, the FEC encoding section 135*a*1 is configured to perform the error correction encoding processing toward the "uplink user data (E-DCH)", that is, the transport block, transmitted from the MAC-e functional section 134.

In addition, as shown in FIG. 9, the transmission rate matching section 135*a*2 is configured to perform, toward the transport block to which the error correction encoding processing is performed, the processing of repetition (repeat of bit) and "puncture (bit skipping)" in order to match to the transmission capacity in the physical channel.

The physical channel mapping section 135*b* is configured to pair the "uplink user data (E-DCH)" from the transmission channel encoding section 135*a* with the E-DPDCH, and to pair the E-TFI and the HARQ information from the transmission channel encoding section 135*a* with the E-DPCCH.

The E-DPDCH transmitting section 135*c* is configured to perform a transmission processing of the E-DPDCH.

The E-DPCCH transmitting section 135*d* is configured to perform a transmission processing of the E-DPCCH.

The E-HICH receiving section 135*e* is configured to receive an "E-DCH HARQ Acknowledgement Indicator Channel (E-HICH)" transmitted from the radio base station Node B.

The E-RGCH receiving section 135*f* is configured to receive the E-RGCH transmitted from the radio base station Node B (the serving cell and the non-serving cell for the mobile station UE).

The E-AGCH receiving section 135*g* is configured to receive the E-AGCCH transmitted from the radio base station Node B (the serving cell for the mobile station UE).

The physical channel de-mapping section 135*h* is configured to extract the ACK/NACK for the uplink user data which is included in the E-HICH received by the E-HICH receiving section 135*e*, so as to transmit the extracted ACK/NACK for the uplink user data to the MAC-e functional section 134.

In addition, the physical channel de-mapping section 135*h* is configured to extract the scheduling information (the relative transmission rate of the uplink user data, that is, UP command/DOWN command) which is included in the E-RGCH received by the E-RGCH receiving section 135*f*, so as to transmit the extracted scheduling information to the MAC-e functional section 134.

In addition, the physical channel de-mapping section 135*h* is configured to extract the scheduling information (the absolute transmission rate of the uplink user data) which is included in the E-AGCH received by the E-AGCH receiving section 135*g*, so as to transmit the extracted scheduling information to the MAC-e functional section 134.

Figure 10:
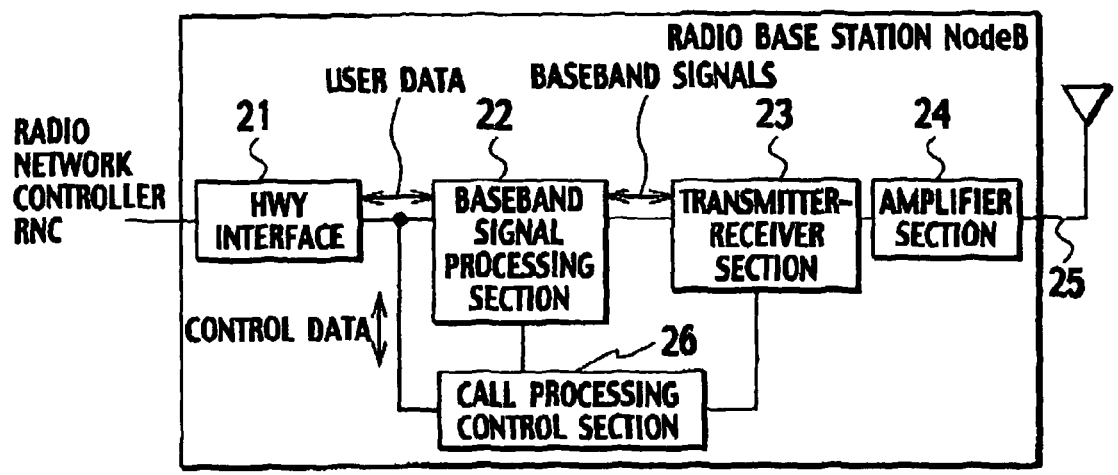
FIG. 10 is a functional block diagram of a radio base station according to the first embodiment of the present invention.

FIG. 10 shows an example of a configuration of functional blocks of a radio base station Node B according to this embodiment.

As shown in FIG. 10, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 11:
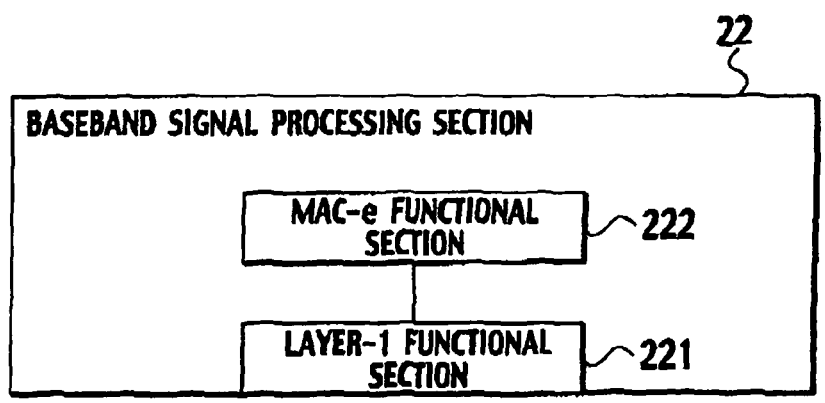
FIG. 11 is a functional block diagram of a baseband signal processing section in the radio base station of the mobile communication system according to the first embodiment of the present invention.

FIG. 11 is a functional block diagram of the baseband signal processing section 22.

As shown in FIG. 11, the baseband signal processing section 22 is provided with a layer-1 functional section 221, and a MAC-e functional section 222.

Figure 12:
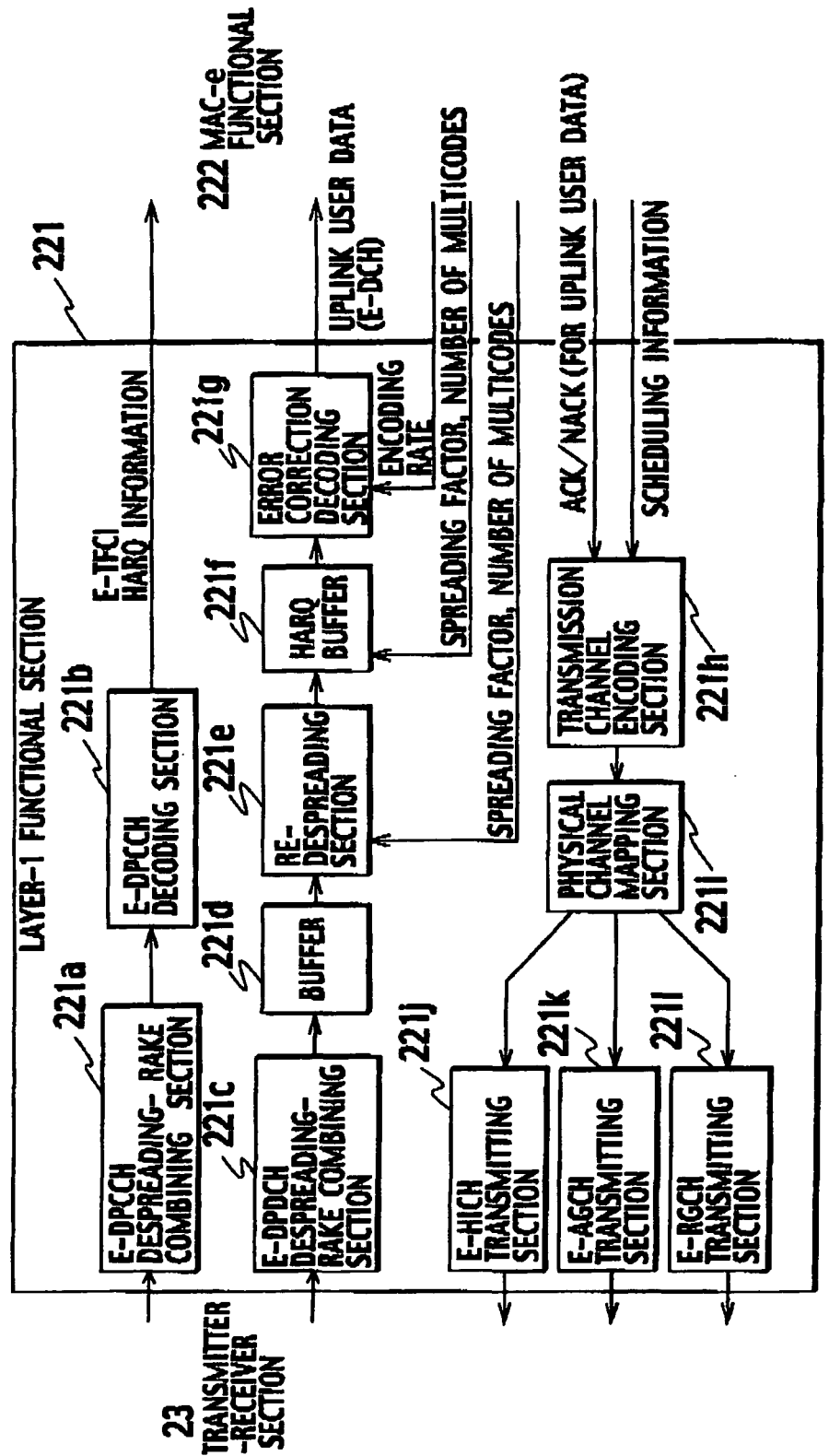
FIG. 12 is a functional block diagram of a layer-1 functional section in the baseband signal processing section in the radio base station of the mobile communication system according to the first embodiment of the present invention.

As shown in FIG. 12, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, and an E-RGCH transmitting section 221l.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221d using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the HARQ buffer 221f based on the coding rate which is notified from the MAC-e functional section 222, so as to transmit the acquired "uplink user data (E-DCH)" to the MAC-e functional section 222.

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221h, with the E-RGCH.

The E-HICH transmitting section 221j is configured to perform the transmission processing of the E-HICH.

The E-AGCH transmitting section 221k is configured to perform the transmission processing of the E-AGCH.

The E-RGCH transmitting section 221l is configured to perform the transmission processing of the E-RGCH.

The E-AGCH transmitting section 221k is configured to set the transmission time interval of the E-AGCH, so as to differ the transmission time interval of the E-AGCH from the transmission time interval of the E-DPCH.

Then, the E-AGCH transmitting section 221k is configured to transmit the absolute transmission rate of the uplink user data, by using the set transmission time interval of the E-AGCH.

Figure 13:
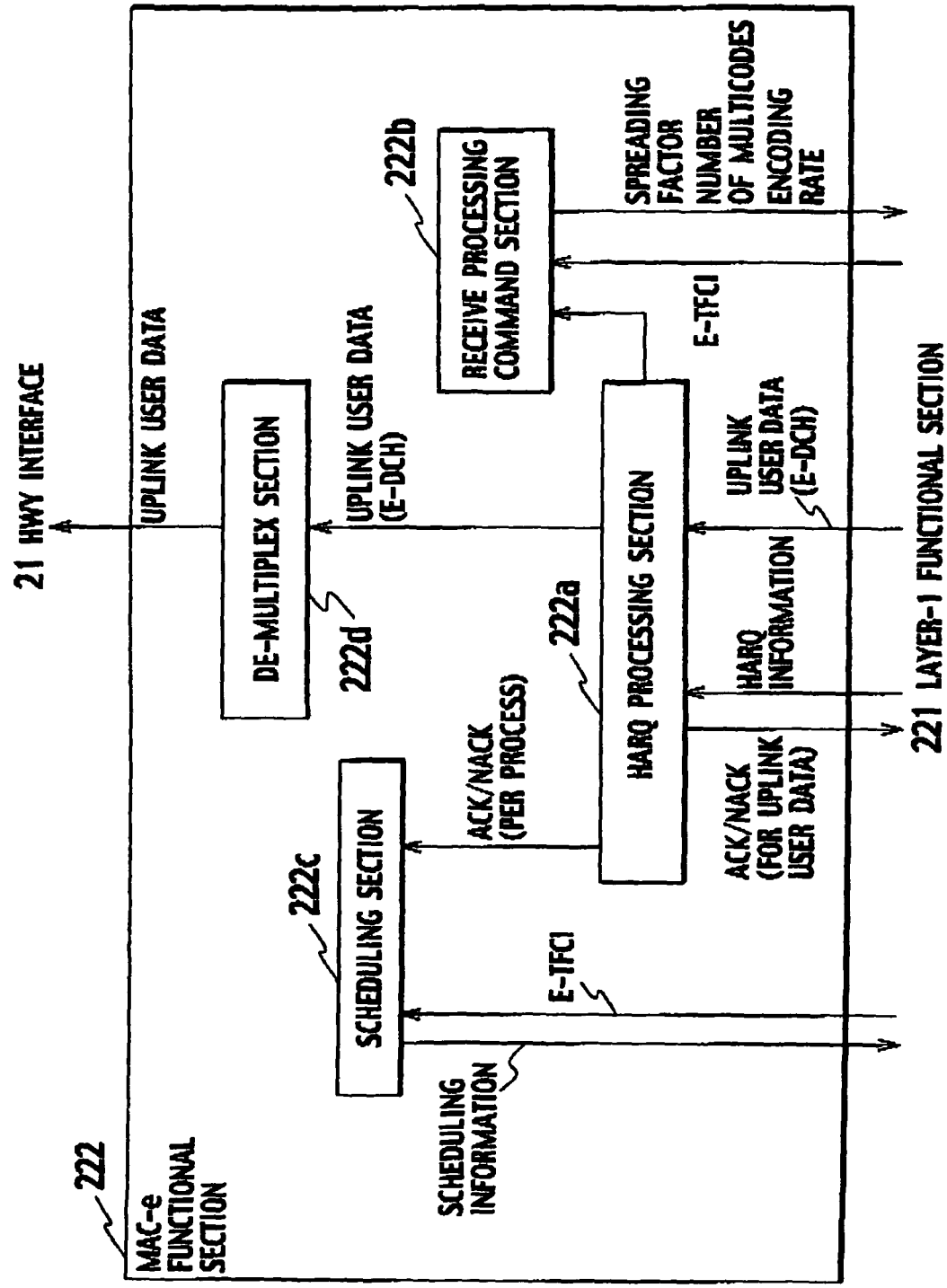
FIG. 13 is a functional block diagram of a MAC-e functional section in the baseband signal processing section in the radio base station of the communication system according to the first embodiment of the present invention.

As shown in FIG. 13, the MAC-e functional section 222 is provided with an HARQ processing section 222a, a receive processing command section 222b, a scheduling section 222c, and a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

The receive processing command section 222b is configured to notify, to the re-despreading section 221e and the HARQ buffer 221f, the spreading factor and the number of multi-codes for the transport format of each mobile station UE, which is specified by the E-TFCI per TTI received from the E-DPCCH decoding section 221b in the layer-1 functional section 221. Then, the receive processing command section 222b is configured to notify the encoding rate to the error correction decoding section 221g.

The scheduling section 222c is configured to change the absolute transmission rate or the relative transmission rate of the uplink user data, based on the E-TFCI per TTI received from the E-DPCCH decoding section 221b in the layer-1 functional section 221, the ACK/NACK per process received from the HARQ processing section 222a, the interference level, and the like.

In addition, the scheduling section 222c is configured to notify, to the layer-1 functional section 221 via the DCH, the absolute transmission rate or the relative transmission rate of the uplink user data, as the scheduling information.

The de-multiplex section 222d is configured to perform the de-multiplex processing to the "uplink user data (E-DCH)" received from the HARQ processing section 222a, so as to transmit the acquired uplink user data to the HWY interface 21.

The radio network controller RNC according to this embodiment is an apparatus located in an upper level of the radio base station Node B, and is configured to control radio communications between the radio base station Node B and the mobile station UE.

Figure 14:
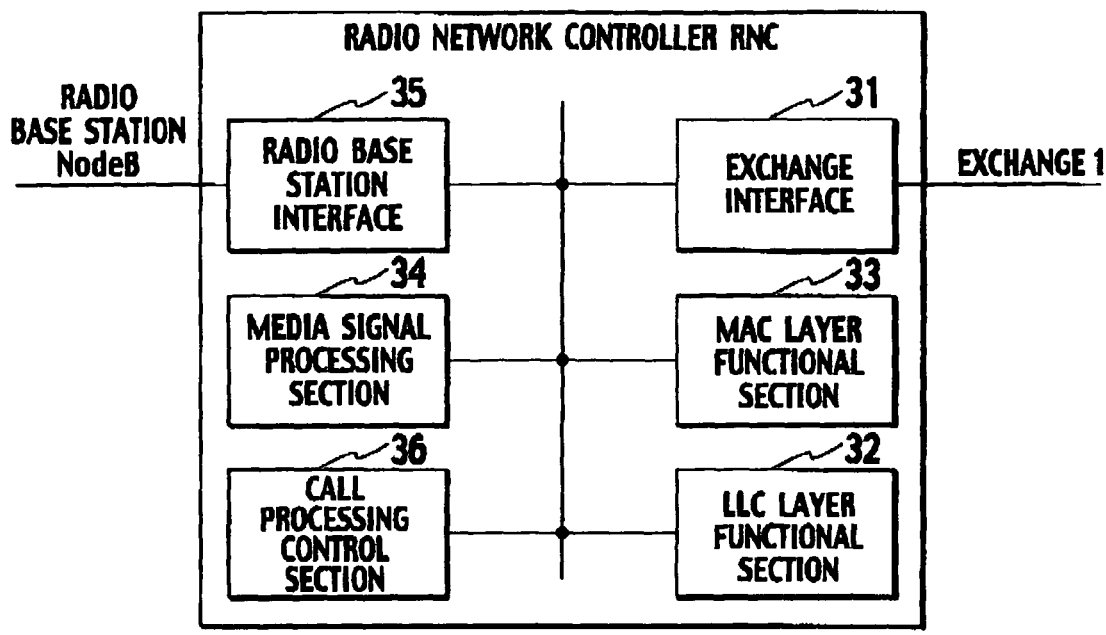
FIG. 14 is a functional block diagram of a radio network controller of the mobile communication system according to the first embodiment of the present invention.

As shown in FIG. 14, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

(Operations of Mobile Communication System According to First Embodiment of the Present Invention)

Figure 15:
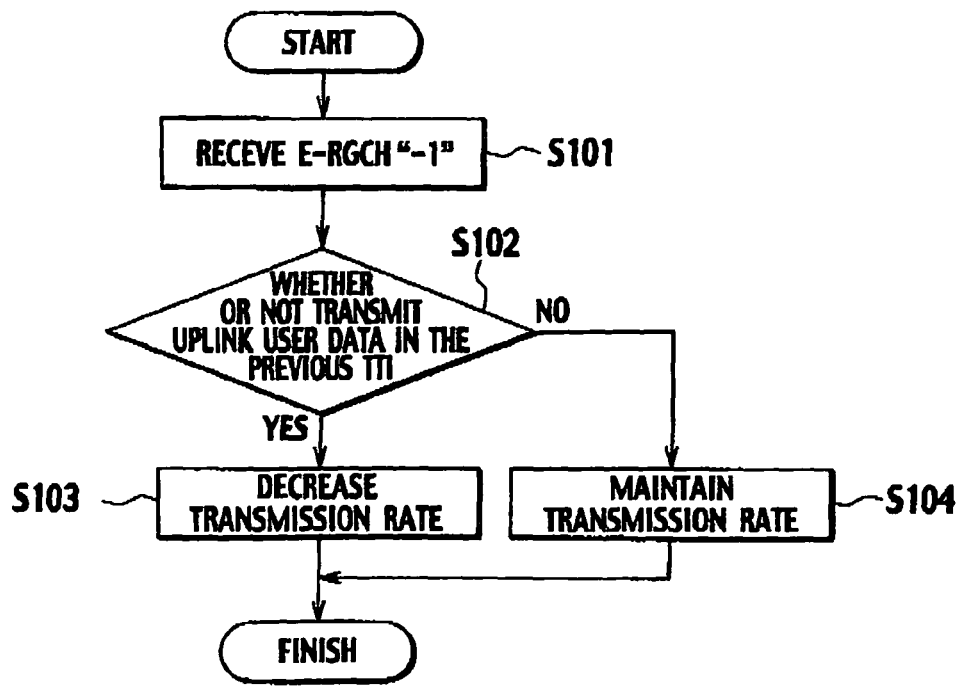
FIG. 15 is a flowchart showing operations of transmission rate control method in the mobile communication system according to the first embodiment of the present invention.

Referring to FIG. 15, operations of the mobile communication system according to this embodiment will be described. Specifically, the operations of controlling the transmission rate of the uplink user data in the mobile communication system according to this embodiment will be described.

As shown in FIG. 15, in step S101, the mobile station UE receives a "Down command (−1)" from the radio base station Node B (the serving cell or the non-serving cell for the mobile station UE) via the E-RGCH.

In step S102, the mobile station UE judges whether or not the mobile station UE transmits the uplink user data in the previous TTI, so as to judge whether or not the uplink user data to be transmitted becomes empty in the transmission buffer.

When it is determined that the uplink user data to be transmitted exists in the transmission buffer, in step S103, the mobile station UE decreases the transmission rate of the uplink user data by a predetermined value.

On the other hand, when it is determined that the uplink user data to be transmitted does not exist in the transmission buffer, in step S104, the mobile station UE maintains the transmission rate of the uplink user data.

Only when the mobile station UE receives a "Down command (−1)" from the serving cell, and it is determined that the uplink user data to be transmitted does not exist in the transmission buffer, the mobile station UE may maintain the transmission rate of the uplink user data.

When the mobile station UE receives a "Down command (−1)" from the non-serving cell, and it is determined that the uplink user data to be transmitted does not exist in the transmission buffer, the mobile station UE may decrease the transmission rate of the uplink user data by a predetermined value.

(Effects of Mobile Communication System According to First Embodiment of the Present Invention)

According to the mobile communication system of the present invention, the mobile station UE is configured not to decrease the transmission rate of the uplink user data, but to maintain the transmission rate of the uplink user data, when the mobile station UE receives the "Down command" via the E-RGCH, and when the uplink user data to be transmitted become empty in the transmission buffer. Therefore, it is possible to realize a smooth data transmission without decreasing the transmission rate of the uplink user data, even when other uplink user data to be transmitted reoccurs in the transmission buffer after the uplink user data to be transmitted becomes empty in the transmission buffer.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for transmission of data according to transmission time intervals (TTI), comprising:

transmitting, at a radio base station, via a relative rate grant channel, a command for controlling a transmission rate in uplink to a mobile station (UE);

determining, at the mobile station (UE), the transmission rate in a current transmission time interval, based on the command received via the relative rate grant channel; wherein determining, at the mobile station (UE), in the current transmission time interval, to maintain the transmission rate unchanged, when data was not transmitted in a previous transmission time interval and a command received via the relative rate grant channel indicates to decrease the transmission rate.

2. A mobile station (UE) for transmission of data according to transmission time intervals (TTI), comprising:

a receiving section configured to receive, via a relative rate grant channel, a command for controlling a transmission rate in uplink, from a radio base station;

a transmission control section configured to determine the transmission rate in a current transmission time interval, based on the command received via the relative rate grant channel; and wherein the transmission control section is configured to maintain, in the current transmission time interval, the transmission rate unchanged, based on data not being transmitted in a previous transmission time interval and a command received via the relative rate grant channel indicates to decrease the transmission rate.

3. The mobile station according to claim 2, wherein the transmission control section is configured to perform HARQ process control and to maintain, in a current transmission time interval assigned to a certain HARQ process, the transmission rate unchanged, when data were not transmitted in a previous transmission time interval assigned to the certain HARQ process and a command received via the relative rate grant channel indicates to decrease the transmission rate.

* * * * *